United States Patent
Dunphy et al.

(10) Patent No.: US 12,553,996 B2
(45) Date of Patent: Feb. 17, 2026

(54) SYSTEMS AND METHODS FOR RETROREFLECTOR MITIGATION USING LIDAR

(71) Applicant: Waymo LLC, Mountain View, CA (US)

(72) Inventors: James Dunphy, San Jose, CA (US); Caner Onal, Palo Alto, CA (US); David Schleuning, Piedmont, CA (US)

(73) Assignee: Waymo LLC, Mountain View, CA (US)

( * ) Notice: Subject to any disclaimer, the term of this patent is extended or adjusted under 35 U.S.C. 154(b) by 1115 days.

(21) Appl. No.: 17/363,658

(22) Filed: Jun. 30, 2021

(65) Prior Publication Data

US 2023/0003852 A1 Jan. 5, 2023

(51) Int. Cl.
  *G01S 7/497* (2006.01)
  *G01S 7/48* (2006.01)
  *G01S 17/931* (2020.01)

(52) U.S. Cl.
  CPC ............ *G01S 7/497* (2013.01); *G01S 7/4802* (2013.01); *G01S 17/931* (2020.01)

(58) Field of Classification Search
  CPC ...... G01S 7/497; G01S 17/931; G01S 7/4802; G01S 7/4873
  See application file for complete search history.

(56) References Cited

U.S. PATENT DOCUMENTS

| | | | |
|---|---|---|---|
| 9,368,936 B1 | 6/2016 | Lenius et al. | |
| 10,254,388 B2* | 4/2019 | LaChapelle | G01S 7/497 |
| 10,999,524 B1* | 5/2021 | Duelli | G01S 17/894 |
| 11,988,775 B1* | 5/2024 | Waschura | G01S 7/4815 |
| 2018/0239005 A1* | 8/2018 | Dussan | G01S 7/4865 |
| 2020/0072946 A1 | 3/2020 | Fisher et al. | |
| 2020/0141716 A1 | 5/2020 | Droz et al. | |
| 2021/0109215 A1* | 4/2021 | Schmitz | G01S 17/931 |
| 2021/0165094 A1 | 6/2021 | Droz et al. | |
| 2022/0026574 A1* | 1/2022 | Vaello Paños | G06V 10/145 |

OTHER PUBLICATIONS

European Patent Office, Extended European Search Report mailed Nov. 16, 2022, issued in connection with European Patent Application No. 22178882.1, 9 pages.

* cited by examiner

*Primary Examiner* — Yuqing Xiao
*Assistant Examiner* — Sean C. Grant
(74) *Attorney, Agent, or Firm* — McDonnell Boehnen Hulbert & Berghoff LLP (57) ABSTRACT

The present disclosure relates to light detection and ranging (lidar) systems, lidar-equipped vehicles, and associated methods. An example method includes causing a firing circuit to trigger emission of an initial group of detection pulses from at least one light-emitter device of a lidar system in accordance with an initial set of one or more light-emission parameters. The method also includes causing the firing circuit to trigger emission of one or more test pulses and receiving, from at least one detector, information indicative of one or more return test pulses. The method yet further includes determining, based on the received information, a presence of a retroreflector based on an intensity of the return test pulse. The method additionally includes determining a subsequent set of light-emission parameters and causing the firing circuit to trigger emission of a subsequent group of detection pulses in accordance with the subsequent set of light-emission parameters.

20 Claims, 8 Drawing Sheets

SYSTEMS AND METHODS FOR RETROREFLECTOR MITIGATION USING LIDAR

BACKGROUND

Light detection and ranging (lidar) systems may be used to determine ranges to objects in an environment. Such range information can be aggregated into a dynamic "point cloud" that can be used for object detection, object avoidance, and/or navigation, for example. In an example application, lidar systems may be utilized by an autonomous vehicle to identify objects, such as other vehicles, roadways, signs, pedestrians, buildings, etc.

Conventional lidar systems can be adversely affected when interacting with highly-back-reflective objects, also termed retroreflectors, within the environment. Retroreflectors are both very reflective and also direct incoming light back in the direction of the source with minimal scatter in other directions. For example, light pulses emitted by lidar systems can be reflected with high efficiency by such retroreflectors so that the return light pulses saturate lidar detectors and/or create crosstalk (e.g., blooming) between lidar detector channels. In such scenarios, bright light pulses from retroreflectors can temporarily disable a lidar system, at least in part, until the detector channel recovers. Accordingly, improved systems and methods that mitigate the effect of retroreflector objects in lidar systems are desired.

SUMMARY

The present disclosure relates to lidar systems and methods of their use that may be configured to dynamically adjust various aspects of light emitted into an environment based on information about retroreflectors in the environment. In various embodiments, return information from one or more test pulses may be utilized to control subsequent detection light pulses emitted from the lidar system. In some examples, such embodiments could include lidar systems configured to be utilized with self-driving vehicles.

In a first aspect, a light detection and ranging (lidar) system is provided. The lidar system includes a plurality of light-emitter devices configured to emit light pulses into an environment. The lidar system also includes a firing circuit configured to selectively control the plurality of light-emitter devices to emit the light pulses in accordance with one or more adjustable light-emission parameters. The lidar system additionally includes a plurality of detectors. The lidar system also includes a controller configured to perform operations. The operations include causing the firing circuit to trigger emission of an initial group of detection pulses from at least one light-emitter device in accordance with an initial set of one or more light-emission parameters. The operations additionally include causing the firing circuit to trigger emission of at least one test pulse. The operations also include receiving, from at least one detector, information indicative of at least one return test pulse that corresponds to an interaction between the at least one test pulse and an object in the environment. The operations further include determining, based on the received information, a presence of a retroreflector based on an intensity of the return test pulse being above a threshold level. The operations also include, in response to determining the presence of the retroreflector, determining a subsequent set of one or more light-emission parameters. The subsequent set of one or more light-emission parameters is different than the initial set of one or more light-emission parameters. The operations yet further include causing the firing circuit to trigger emission of a subsequent group of detection pulses in accordance with the subsequent set of one or more light-emission parameters In a second aspect, a vehicle is provided. The vehicle includes a light detection and ranging (lidar) system. The lidar system includes a plurality of light-emitter devices configured to emit light pulses into an environment. The lidar system additionally includes a firing circuit configured to selectively control the plurality of light-emitter devices to emit the light pulses in accordance with one or more adjustable light-emission parameters. The lidar system also includes a plurality of detectors. The lidar system further includes a controller configured to perform operations. The operations include causing the firing circuit to trigger emission of an initial group of detection pulses from at least one light-emitter device in accordance with an initial set of one or more light-emission parameters. The operations also include causing the firing circuit to trigger emission of at least one test pulse. The operations additionally include receiving, from at least one detector, information indicative of at least one return test pulse that corresponds to an interaction between the at least one test pulse and an object in the environment. The operations yet further include determining, based on the received information, a presence of a retroreflector based on an intensity of the return test pulse being above a threshold level. The operations also include determining a subsequent set of one or more light-emission parameters. The subsequent set of one or more light-emission parameters is different than the initial set of one or more light-emission parameters. The operations additionally include causing the firing circuit to trigger emission of a subsequent group of detection pulses.

In a third aspect, a method is provided. The method includes causing a firing circuit to trigger emission of an initial group of detection pulses from at least one light-emitter device of a lidar system in accordance with an initial set of one or more light-emission parameters. The method also includes causing the firing circuit to trigger emission of at least one test pulse. The method also includes receiving, from at least one detector, information indicative of at least one return test pulse that corresponds to an interaction between the at least one test pulse and an object in an environment. The method additionally includes determining, based on the received information, a presence of a retroreflector based on an intensity of the return test pulse being above a threshold level. The method yet further includes, in response to determining the presence of the retroreflector, determining a subsequent set of one or more light-emission parameters. The subsequent set of one or more light-emission parameters is different than the initial set of one or more light-emission parameters. The method also includes causing the firing circuit to trigger emission of a subsequent group of detection pulses in accordance with the subsequent set of one or more light-emission parameters.

Other aspects, embodiments, and implementations will become apparent to those of ordinary skill in the art by reading the following detailed description, with reference where appropriate to the accompanying drawings.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting.

Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Present embodiments describe lidar systems and methods that may reduce or eliminate the negative effects of retroreflectors or other highly reflective objects in the environment. Within the context of this disclosure, a retroreflector could include a device or surface that reflects light back towards the light source with minimal scattering or optical loss/attenuation. Additionally or alternatively, the retroreflector could reflect light back toward the lidar system with much higher efficiency as compared to an object that may provide one or more diffuse reflective surfaces.

An example lidar system may include a plurality of light-emitter devices configured to emit pulses of laser light into an environment. As an example, an environment could include an interior or exterior environment, such as inside a building or outside of the building. Additionally or alternatively, the environment could include a vicinity around and/or on a roadway. Furthermore, the environment could include objects such as other vehicles, traffic signs, pedestrians, roadway surfaces, buildings, terrain, etc. Additionally light pulses could be emitted into a local environment of the lidar system itself. For example, the light pulses could interact with a housing of the lidar system and/or surfaces or structures coupled to the lidar system. In some cases, the lidar system could be mounted to a vehicle. In such scenarios, the lidar system could be configured to emit light pulses that interact with surfaces of the vehicle.

The lidar system may additionally include a firing circuit configured to selectively control the plurality of light-emitter devices to emit the light pulses in accordance with one or more adjustable light-emission parameters. The lidar system also includes a plurality of detectors configured to receive return light generated by interactions between the emitted laser light pulses and the environment.

The lidar system also includes a controller having at least one processor and a memory. The processor may execute instructions stored in the memory so as to perform various operations.

The operations include causing the firing circuit to trigger emission of an initial group of detection pulses from at least one light-emitter device in accordance with an initial set of one or more light-emission parameters.

The operations also include causing the firing circuit to trigger emission of at least one test pulse and receiving, from at least one detector, information indicative of at least one return test pulse that corresponds to an interaction between the at least one test pulse and an object in the environment.

The operations also include determining, based on the received information, a presence of a retroreflector based on an intensity of the return test pulse being above a threshold level. Additionally or alternatively, the operations could include determining, based on the received information, a presence of a sufficiently bright object (e.g., an object with a very bright lambertian reflectance).

The operations additionally include, in response to determining the presence of the retroreflector, determining a subsequent set of one or more light-emission parameters. In such scenarios, the subsequent set of one or more light-emission parameters is different than the initial set of one or more light-emission parameters.

The operations also include causing the firing circuit to trigger emission of a subsequent group of detection pulses in accordance with the subsequent set of one or more light-emission parameters.

In some examples, the operations of causing the firing circuit to trigger emission of the at least one test pulse, receiving information indicative of the at least one return pulse, and determining the presence of the retroreflector could occur during a test pulse phase that is between 1 to 5 microseconds in duration.

In some embodiments, the subsequent set of light-emission parameters could include a different pulse energy parameter, a different pulse repetition rate parameter, and/or a different pulse number parameter than the initial set of light emission parameters, such that emitted light pulses in the subsequent group of detection pulses have a different pulse energy, a different pulse repetition rate, or a different number of pulses than emitted light pulses in the initial group of detection pulses. Additionally or alternatively, the subsequent set of light-emission parameters could include changing the shot pattern of light pulses emitted into the environment. Furthermore, the spatial resolution of light pulses could be adjusted (e.g., reduce resolution as a tradeoff for reduced artifacts due to bright returns). In other words, the subsequent set of light-emission parameters could trigger a subsequent set of light pulses with different spatio-temporal characteristics than that of the test pulse(s).

In various embodiments, the operations could also include causing the firing circuit to trigger emission of the subsequent group of detection pulses from the at least one light-emitter device.

Additionally or alternatively, the operations could include a test pulse phase and a detection pulse phase, wherein the test pulse phase and the detection pulse phase are between 1 to 500 microseconds in total duration. It will be understood that other time periods are possible. For example, the test pulse phase and the detection pulse phase could be between 10 and 25 microseconds, 5 and 10 microseconds, and/or between 25 and 50 microseconds in total duration.

Example embodiments include that the subsequent group of detection pulses could include between 1 to 500 successive light pulses or between 10 to 25 successive light pulses. In such scenarios, the at least one detector is configured to aggregate the intensity of return pulses that correspond to interactions between the detection pulses and the environment.

In some examples, adjusting the firing circuit to change at least one aspect of the subsequent group of detection pulses could be further based on determining the presence of a retroreflector during a plurality of test pulse phase (e.g., prior return information).

Yet further, the operations could additionally include dynamically adjusting the threshold level based on at least one of: detector soiling, background light conditions, weather conditions, or precipitation. In some embodiments, detector soiling could include dust, soil, mud, or other organic or inorganic matter that may collect along an optical surface of the lidar system. Additionally or alternatively, detector soiling could include water droplets and/or condensation.

Optionally, the plurality of light-emitter devices could include an array of vertical-cavity surface-emitting lasers (VCSELs). However, other types of light-emitter devices are possible and contemplated. In some examples, the plurality of detectors could form an array of detector elements that may be grouped into at least one macropixel. Other arrangements of detector elements are possible and contemplated.

Figure 1:
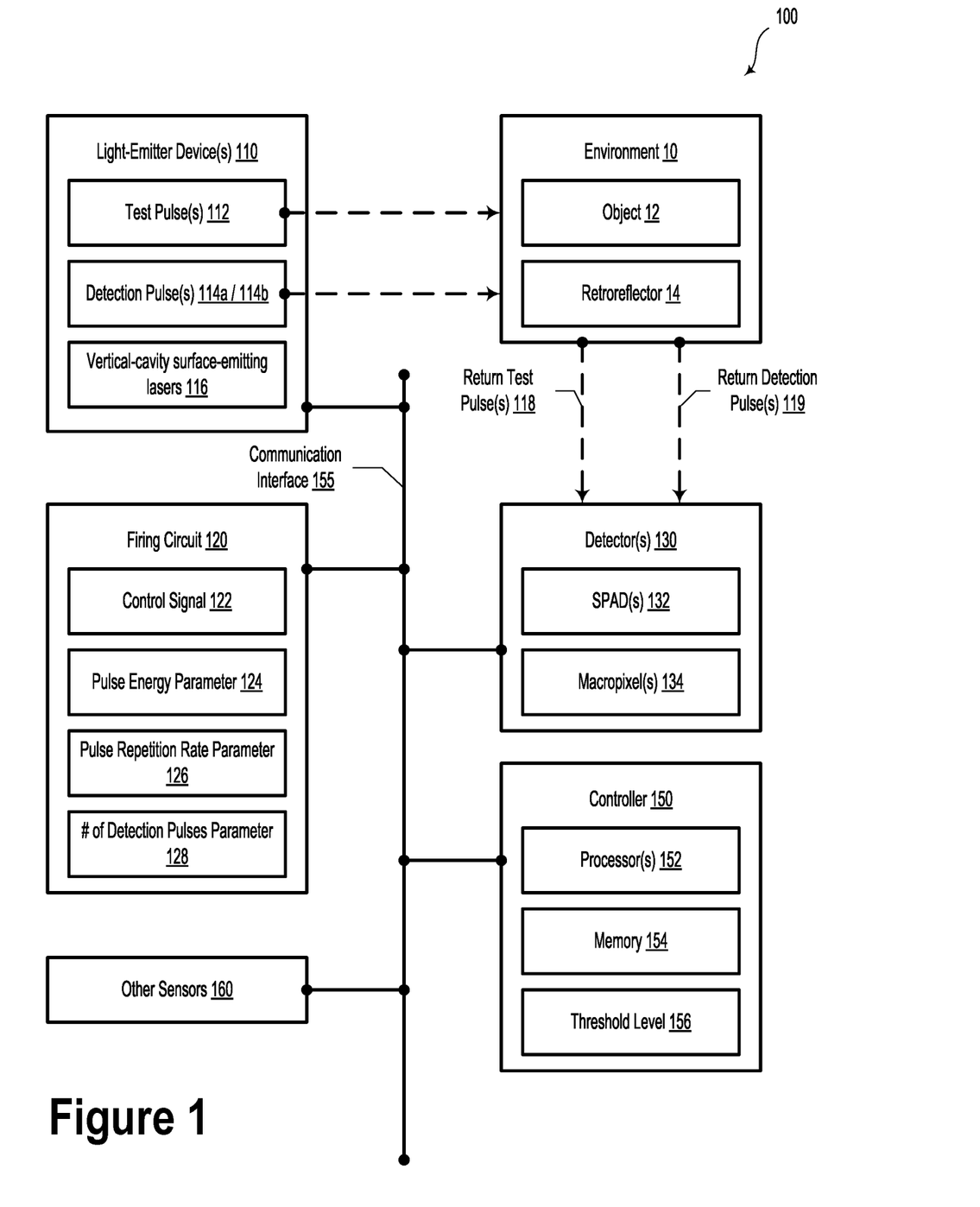
FIG. 1 illustrates a light detection and ranging (lidar) system, according to an example embodiment.

FIG. 1 illustrates a light detection and ranging (lidar) system 100, according to an example embodiment. In specific embodiments, the lidar system 100 could provide lidar functionality for a self-driving vehicle, a robot, or another type of vehicle configured to navigate its environment 10. As described herein, the environment 10 could include an interior or exterior environment, such as inside a building or outside of the building. Additionally or alternatively, the environment could include a vicinity around and/or on a roadway. Furthermore, the environment could include objects such as other vehicles, traffic signs, pedestrians, roadway surfaces, buildings, terrain, etc. In some embodiments, the lidar system 100 could be configured to obtain point cloud information that could include information indicative of a plurality of points in specific locations in three-dimensional space. As an example, the point cloud information could indicate the location of objects 12 in the environment 10.

The lidar system 100 includes a plurality of light-emitter devices 110 configured to emit light pulses into an environment 10. The light-emitter devices 110 could include one or more laser diodes (e.g., semiconductor laser bars), light-emitting diodes (LEDs), or other types of devices configured to emit light in discrete light pulses. In some embodiments, the plurality of light-emitter devices 110 could include an array of vertical-cavity surface-emitting lasers (VCSELs) 116.

In some embodiments, the light-emitter devices 110 could be configured to emit light with wavelength around 905 nm. It will be understood that other wavelengths are possible and contemplated.

The lidar system 100 includes a firing circuit 120 configured to selectively control the plurality of light-emitter devices to emit the light pulses in accordance with one or more adjustable light-emission parameters. As an example, the firing circuit 120 could include a laser driver circuit or another type of circuit configured to provide a control signal 122 to cause the light-emitter devices to emit the light pulses in an adjustable and/or controllable manner. The firing circuit 120 could include an application specific integrated circuit (ASIC) or a field-programmable gate array (FPGA). Other types of circuits and computing devices are possible and contemplated.

The lidar system 100 includes a plurality of detectors 130. In some embodiments, the detectors 130 could include a plurality of single photon avalanche detectors (SPADs) and/or silicon photomultiplier (SiPM) devices. Other types of image sensors and photodetector devices are possible and contemplated. In various embodiments, the plurality of detectors 130 could include an array of detector elements that form at least one macropixel. In some examples, a macropixel could include a plurality of detector elements that are physically adjacent and/or associated with one another. In such scenarios, a macropixel could form a large area detector compared to the area of an individual detector element. Systems and methods could relate to examples including a single light-emitter device (e.g., 1 transmitter or 1 Tx) that can be utilized with N detectors (or macropixels) (e.g., N receivers or N Rx). However, it will be understood that disclosed systems and methods could include N Tx to N Rx (e.g., each Tx channel corresponds to an Rx channel) or N Tx to M Rx, where M is greater than N. Other configurations and arrangements of Tx and Rx elements are contemplated and possible.

The lidar system 100 additionally includes a controller 150 having at least one processor 152 and a memory 154. In some embodiments, the controller 150 could be communicatively coupled (e.g., wirelessly or wired) to various elements of lidar system 100 by way of communication interface 155. For example, the controller 150 could be communicatively coupled to the light-emitter devices 110, the firing circuit 120, and/or the detectors 130 by way of the communication interface 155.

The at least one processor 152 could execute instructions stored in the memory 154 so as to perform certain operations. Additionally or alternatively, the controller 150 could include an application specific integrated circuit (ASIC) or a field-programmable gate array (FPGA). Other types of circuits and computing devices are possible and contemplated. The operations include causing the firing circuit 120 to trigger emission of an initial group of detection pulses 114a from the at least one light-emitter device 110 in accordance with an initial set of one or more light-emission parameters (e.g., pulse energy parameter 124, pulse repetition rate parameter 126, and number (#) of detection pulses parameter 128). As an example, pulse energy parameter 124 could include information indicative of a total optical energy (e.g., in Joules) of a light pulse. The pulse energy parameter 124 could be based on an integral of the pulse optical energy over time. The pulse repetition rate parameter 126 could include information indicative of the periodicity of light pulses emitted by the lidar system 100. For example, the light pulses could be emitted by the lidar system 100 at a pulse repetition rate of 1 kHz, 10 kHz, 30 kHz, 100 kHz, or another frequency. In some embodiments, the number (#) of detection pulses parameter 128 could include the number of pulses that are emitted into the environment 10 in the initial group of detection pulses. It will be understood that the initial group of detection pulses 114a may have other characteristic features that could be included in the initial set of one or more light-emission parameters.

The operations could include causing the firing circuit 120 to trigger emission of at least one test pulse 112 from at least one light-emitter device 110. As an example, the controller 150 could transmit a firing signal to the firing circuit 120, which could in turn provide a current and/or voltage pulse to the at least one light-emitter device 110. In response, the at least one light-emitter device 110 could emit one or more test pulses 112 into the environment 10.

The operations could also include receiving, from at least one detector 130, information indicative of at least one return test pulse 118 that corresponds to an interaction between the at least one test pulse 112 and an object 12 in the environment 10.

Put another way, the emitted test pulse(s) 112 could interact with one or more objects 12 and at least a portion of the light of the test pulse(s) 112 could be reflected and/or refracted back towards the lidar system 100. In some embodiments, 0.1% of the photons emitted in a test pulse 112 could be reflected from the object 12 back towards the lidar system 100 as a return test pulse 118. In other embodiments, 60% of the photons emitted in the test pulse 112 could be reflected from the object 12 back towards the lidar system 100 as a return test pulse 118. It will be understood that the test pulses 112 may interact differently with various objects 12 in the environment 10 depending on, for example, various characteristics of the objects 12 including surface characteristics (e.g., smooth or rough), color, shape, orientation, size, among other factors. Highly reflective objects could include, without limitation, smooth mirror-like surfaces, glass, polished metal, corner cubes, among other possibilities. In such scenarios, the highly reflective objects may reflect/refract light back towards the lidar system 100 in a very efficient manner (e.g., over 30%, over 50%, over 70%, or even over 90% of the emitted photons could be reflected back towards the lidar system 100). Such highly reflective objects may be termed retroreflectors 14.

The operations could include determining, based on the received information about the at least one return test pulse 118, a presence of a retroreflector 14 based on an intensity of the return test pulse 118 being above a threshold level 156. In some embodiments, the threshold level 156 could be stored in the memory 154 (e.g., in a database or look-up table). Additionally or alternatively, the threshold level 156 could be a static value, a set of static values, and/or a dynamic value or set of dynamic values. In some examples, the threshold level could be determined dynamically and/or continuously based on the intensity of test pulse returns. In such scenarios, and with sufficient intensity bit depth, various pulse parameters can be continuously modulated.

The operations yet further include, in response to determining the presence of the retroreflector 14, determining a subsequent set of one or more light-emission parameters (e.g., pulse energy parameter 124, pulse repetition rate parameter 126, and/or # of detection pulses parameter 128). The subsequent set of one or more light-emission parameters is different than the initial set of one or more light-emission parameters. As an example, determining the subsequent set of light-emission parameters could include adjusting a pulse energy 124 of the subsequent group of detection pulses 114b; changing a pulse repetition rate 126 of the subsequent group of detection pulses 114b; and/or changing a number of detection pulses 128 in the subsequent group of detection pulses 114b.

In some embodiments, the operations of: 1) causing the firing circuit 120 to trigger emission of the at least one test pulse 112; 2) receiving information indicative of the at least one return pulse 118; and 3) determining the presence of the retroreflector 14 could occur during a test pulse phase that is between 1 to 5 microseconds in duration.

In various examples, the operations may additionally include causing the firing circuit 120 to trigger emission of the subsequent group of detection pulses 114b from the at least one light-emitter device 110.

In example embodiments, the operations could include a test pulse phase and a detection pulse phase. The test pulse phase and the detection pulse phase could be between 10 to 25 microseconds in duration.

In some embodiments, the subsequent group of detection pulses 114b could include between 10 and 25 successive light pulses. In such scenarios, the at least one detector 130 is configured to aggregate the intensity of return pulses (e.g., return detection pulses 119) that correspond to interactions between the detection pulses 114a, 114b and the environment 10.

In some embodiments, determining the subsequent set of one or more light-emission parameters to change at least one aspect of the subsequent group of detection pulses 114b could be further based on determining the presence of a retroreflector 14 during at least one prior test pulse phase. In other words, the determination of the presence of the retroreflector 14 could be performed in a prior test pulse phase. In such scenarios, the presence of the retroreflector 14 could be inferred or determined based on an earlier test pulse cycle.

Put another way, determining the presence of a retroreflector 14 could be performed based on prior return information, which could include information about objects 12 and retroreflectors 14 in the environment 10 obtained from prior lidar scans. Such prior return information could include lidar point cloud information from a prior lidar scan. The prior lidar scan could have been conducted at a prior time by lidar system 100 or by a different lidar system.

In various examples, the operations may include dynamically adjusting the threshold level 156 based on at least one of: detector soiling, lens or lens protection glass soiling, background light conditions, weather conditions (e.g., dust, smoke, fog), or precipitation (e.g., rain, sleet, snow, hail, etc.). In some embodiments, soiling could include accumulation of dirt, oil, organic particles, water, or other particulates on an optical surface (e.g., a lens or optical window) of the lidar system 100. Within the context of the present disclosure, background light conditions could include a lighting condition of an environment, such as daylight, cloudy, hazy, and/or nighttime conditions. For example, the threshold level 156 could be adjusted based on a background light level that could vary due to the time of day, ambient lighting, internal or external temperature, headlights from other vehicles, etc. In some examples, the threshold level 156 could be adjusted based on cracking and/or failure of optical components and/or changes in stray light levels inside an assembly housing of the lidar system 100 during operation. Additionally or alternatively, the threshold level 156 could be adjusted based on rainy, foggy, or snowy conditions. Such environmental conditions could introduce relatively reflective objects (e.g., rain drops or snowflakes) into the environment 10. In such scenarios, the threshold level 156 could be adjusted higher or lower to balance the need to obtain a high definition point cloud with avoiding the oversaturation of detectors 130 due to overbright return pulses or scattering of the overbright return light onto adjacent detector channels other than those intended to receive light from the reflectors direction.

In some embodiments, the operations may additionally include determining a three-dimensional retroreflector object map that could include information indicative of spatial locations of highly reflective objects within the environment 10. Generating such a retroreflector object map may provide a way to predict the relative locations of retroreflectors at a future point in time (e.g., as a vehicle moves within its environment 10).

In some embodiments, information obtained from other sensors 160 could be utilized as a basis to dynamically adjust the threshold level 156 and/or the various aspects of the light pulses (e.g., pulse energy, pulse repetition rate, # of detection pulses, etc.).

Figure 2:
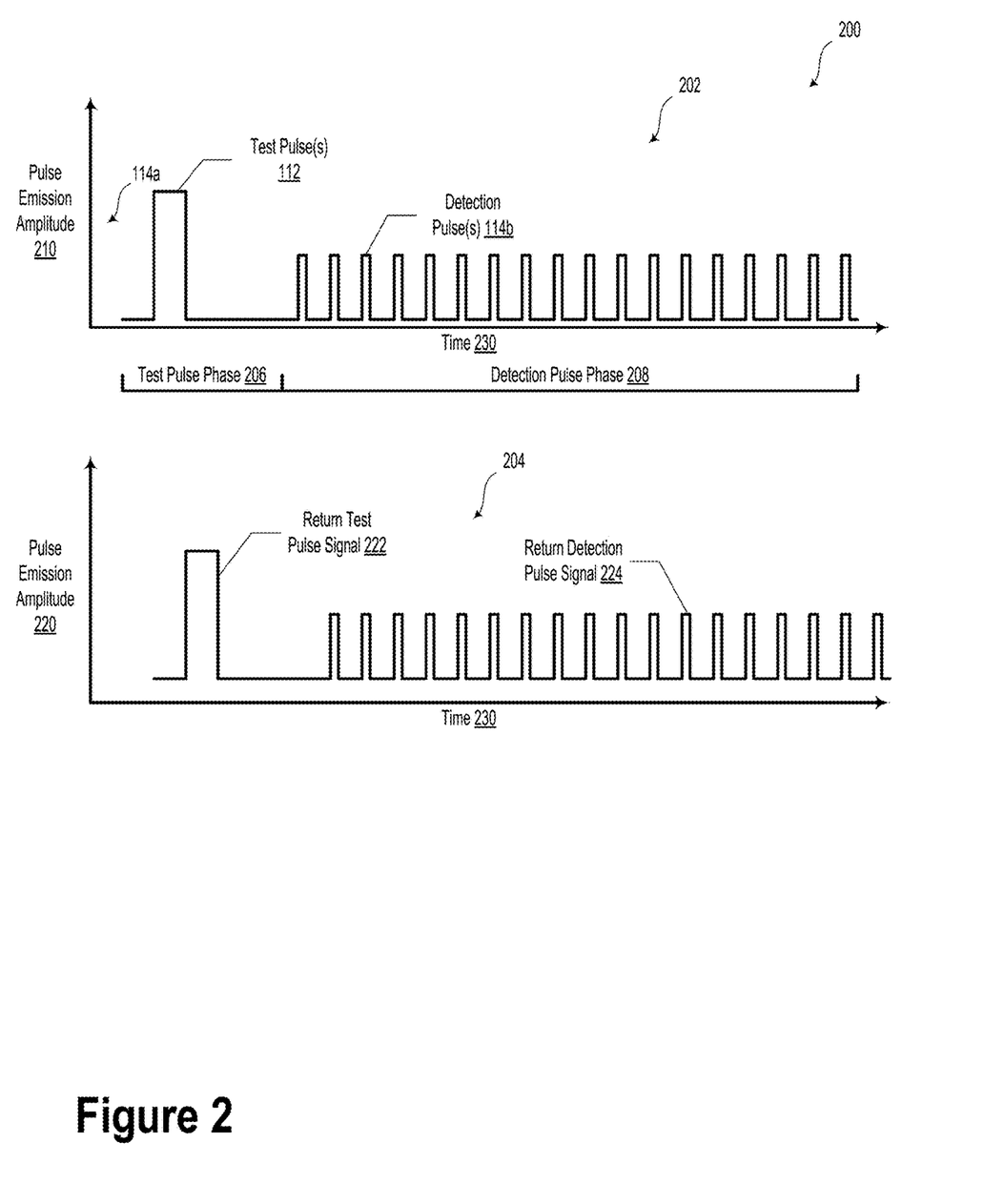
FIG. 2 illustrates an operating scenario, according to an example embodiment.

FIG. 2 illustrates an operating scenario 200, according to an example embodiment. A first signal waveform 202 could represent a pulse emission amplitude 210 as a function of time 230. The first signal waveform 202 could illustrate signals occurring after a plurality of initial detection pulses 114a. Thereafter, the first signal waveform 202 could include one or more test pulses 112 emitted during a test pulse phase 206. The first signal waveform 202 may also include a plurality of detection pulses 114b emitted during a detection pulse phase 208 that could be subsequent to the test pulse phase 206. In some embodiments, the emission amplitude of the detection pulses 114b could be less (e.g., less than 1%, 10%, 50%, etc.) of the emission amplitude of the test pulse(s) 112. Other differences in the relative amplitude of the detection pulses 114b with respect to the test pulse(s) 112 are possible and contemplated. Additionally or alternatively, the detection pulses 114b could have a shorter pulse duration than the test pulse(s) 112.

In some embodiments, the test pulse phase 206 could include a pulse emission period and a listening period. Likewise, the detection pulse phase 208 could include a pulse emission period and a listening period.

A second signal waveform 204 could represent a pulse detection amplitude 220 as a function of time 230. The second signal waveform 204 could be an output of one or more detectors 130 or one or more macropixels 134.

The second signal waveform 204 could include a return test pulse signal 222 and a return detection pulse signal 224. In some embodiments, the return test pulse signal 222 could be based on one or more reflected light pulses associated with the test pulse(s) 112. The return detection pulse signal 224 could be based on the temporal aggregation of reflected light pulses associated with the respective detection pulse(s) 114b. It will be understood that other types of return test pulse signals 222 and return detection pulse signals 224 are possible and contemplated.

Figure 3:
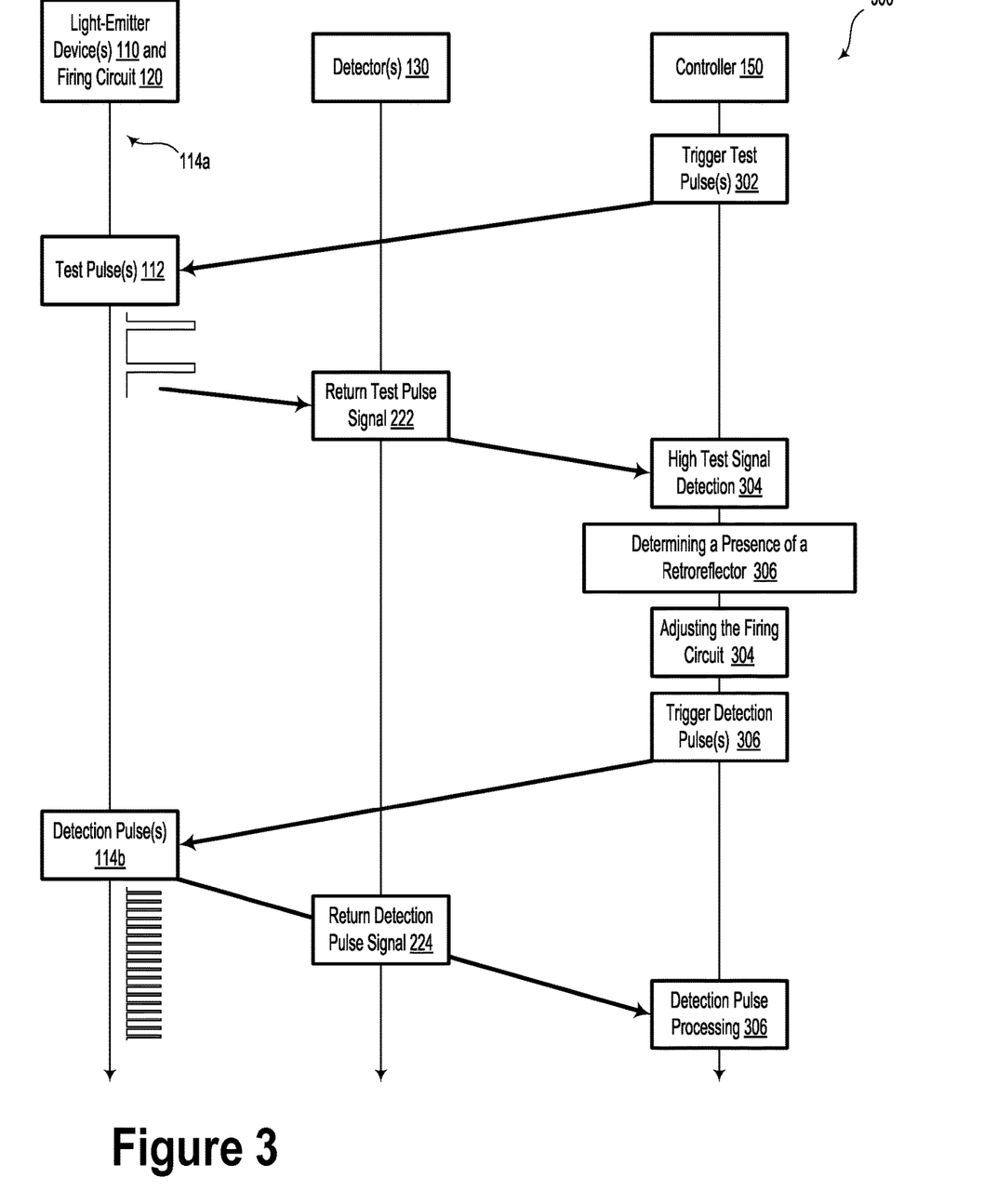
FIG. 3 illustrates a swimlane diagram, according to an example embodiment.

FIG. 3 illustrates a swimlane diagram 300, according to an example embodiment. The swimlane diagram 300 is a flowchart that illustrates the various functions carried out by: 1) the light-emitter device(s) 110 and the firing circuit 120; 2) the detector(s) 130; and 3) the controller 150. As an example, the controller 150 may initially trigger a plurality of initial detection pulses 114a. Subsequently, the controller 150 can trigger one or more initial test pulses 302 by sending a trigger signal to the firing circuit 120 associated with the light-emitter devices 110. The reflected or refracted return light pulses could be measured by the detectors 130 as return light pulse signal 222.

In some examples, the return test pulse signal 222 could be provided to the controller 150 as information indicative of the light intensity/amplitude received at the detector(s) 130. If the amplitude of the return test pulse signal 222 is above the threshold level 156, a high test signal detection 304 could be obtained. Based on the high test signal detection 304, the controller 150 could determine the presence of a retroreflector 306.

In response to determining the presence of the retroreflector 306, the controller 150 could adjust the firing circuit 304. For example, the controller 150 could determine a subsequent set of light-emission parameters (e.g., pulse energy parameter 124, pulse repetition rate parameter 126, or # of detection pulses parameter 128). As an example, upon detecting a retroreflector, the controller 150 could be configured to reduce or completely eliminate, the number of subsequent detection pulses. Alternatively, upon detecting the retroreflector, the firing circuit 304 could be adjusted to change the pulse energy of the detection pulses 114b. Other ways to adjust various aspects of the subsequent detection pulses 114b are possible and contemplated.

The controller 150 could then trigger the detection pulse (s) 306 by sending a detection pulse trigger signal to the firing circuit 120. In turn, the firing circuit 120 could cause the light-emitter devices 110 to emit one or more detection pulses 114b.

Upon interacting with the environment, the detection pulses 114b could be reflected and/or refracted back toward the detectors 130 so as to form a return detection pulse signal 224. The returns could be processed via detection pulse processing 306.

Figure 4:
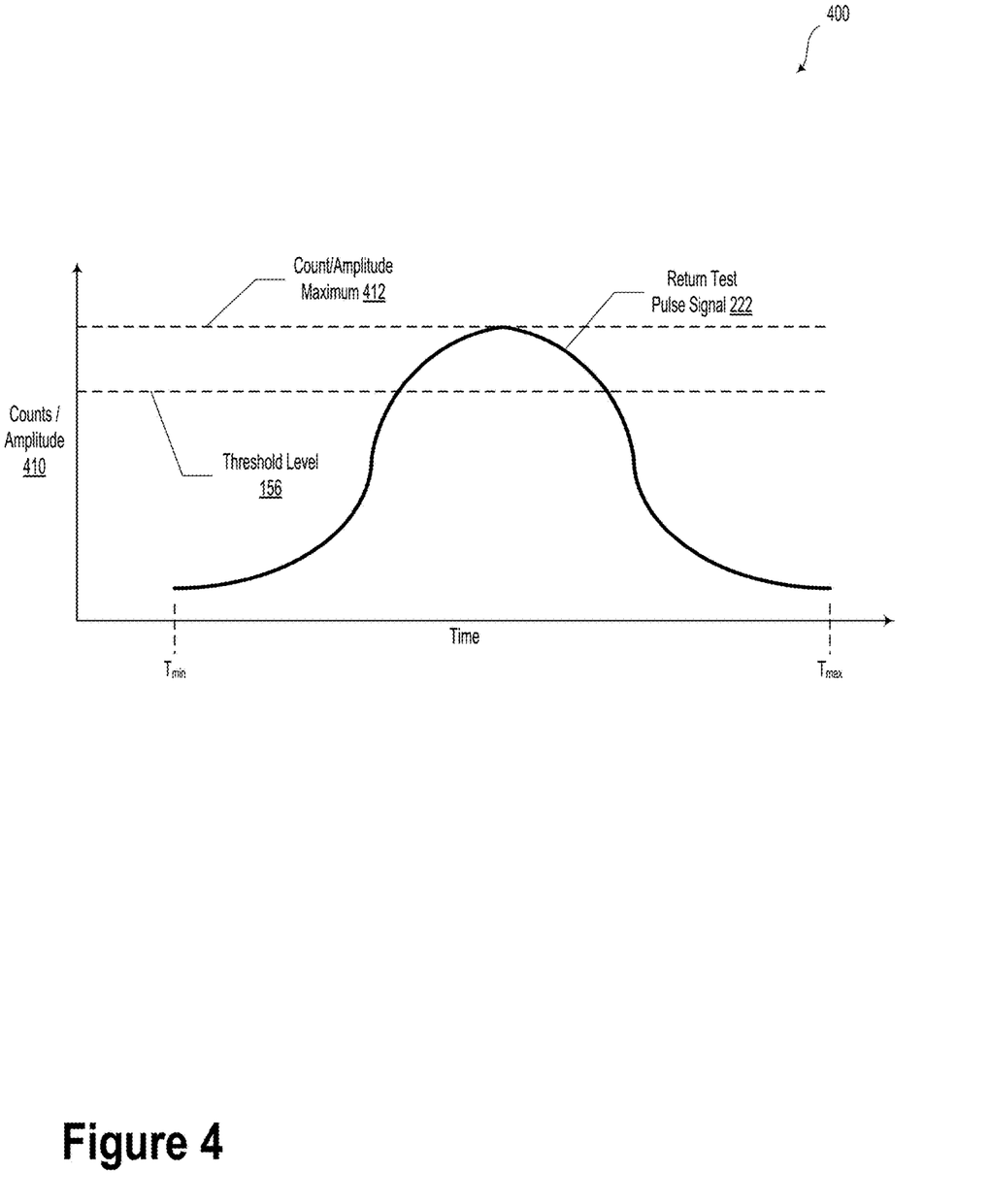
FIG. 4 illustrates an operating scenario, according to an example embodiment.
Figure 5A:
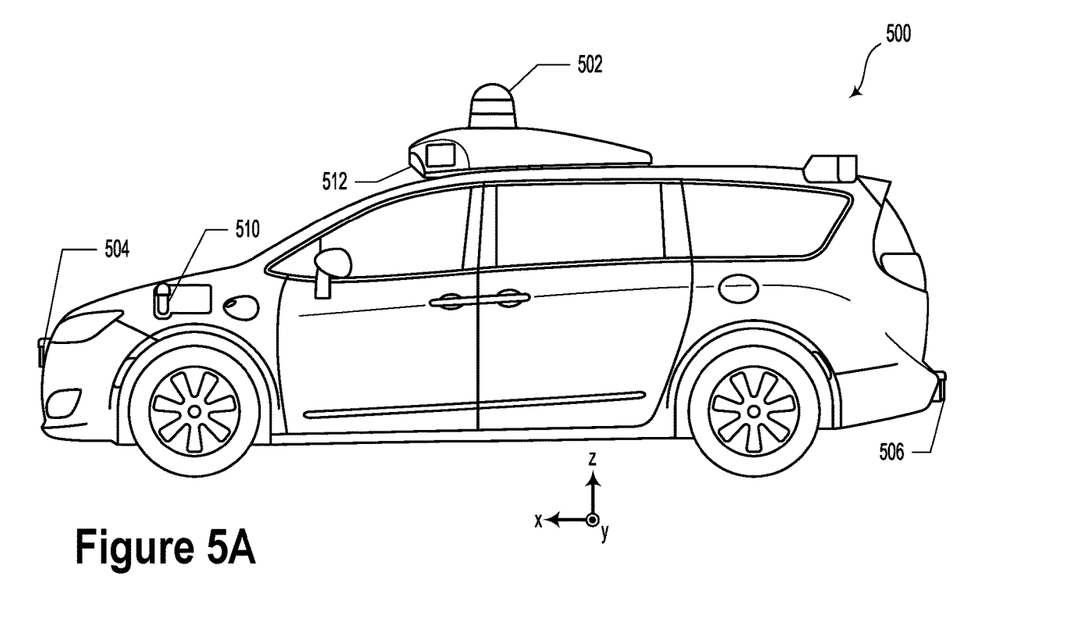
FIG. 5A illustrates a vehicle, according to an example embodiment.
Figure 5B:
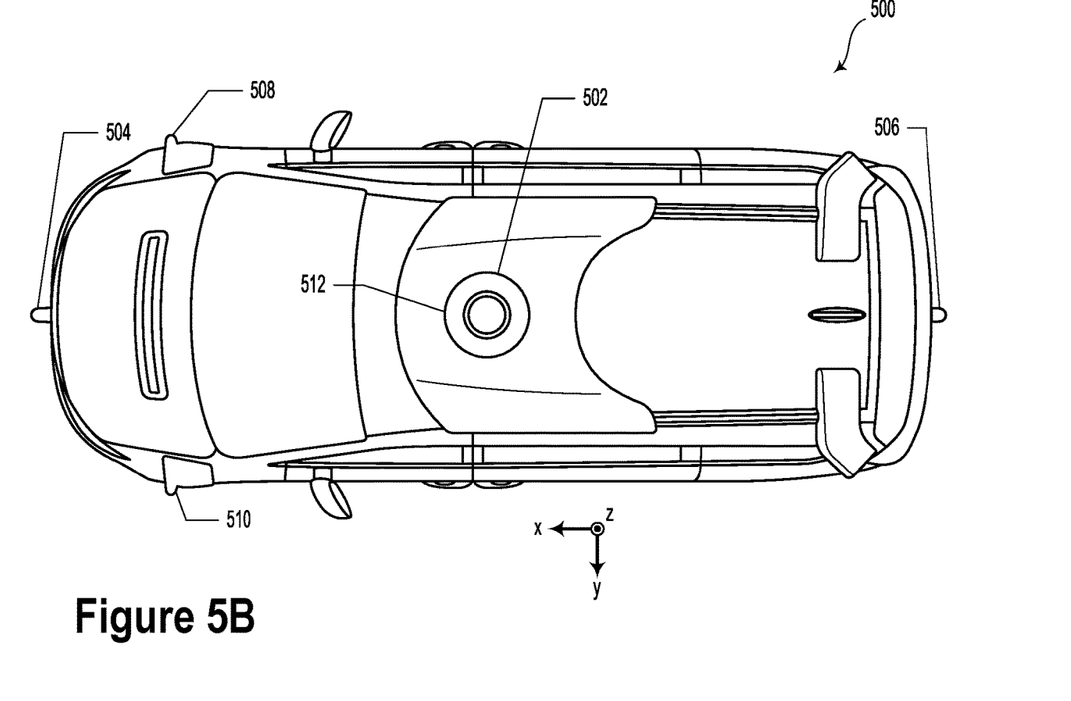
FIG. 5B illustrates a vehicle, according to an example embodiment.
Figure 5C:
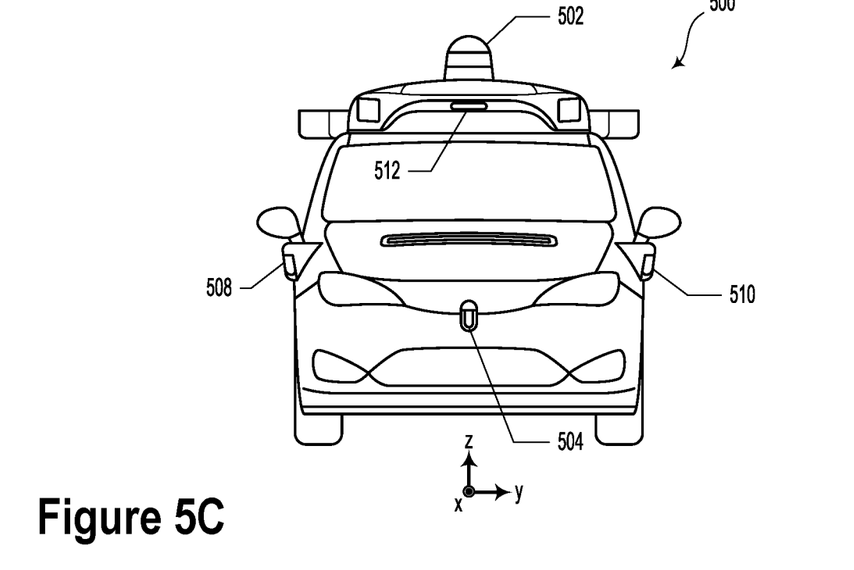
FIG. 5C illustrates a vehicle, according to an example embodiment.
Figure 5D:
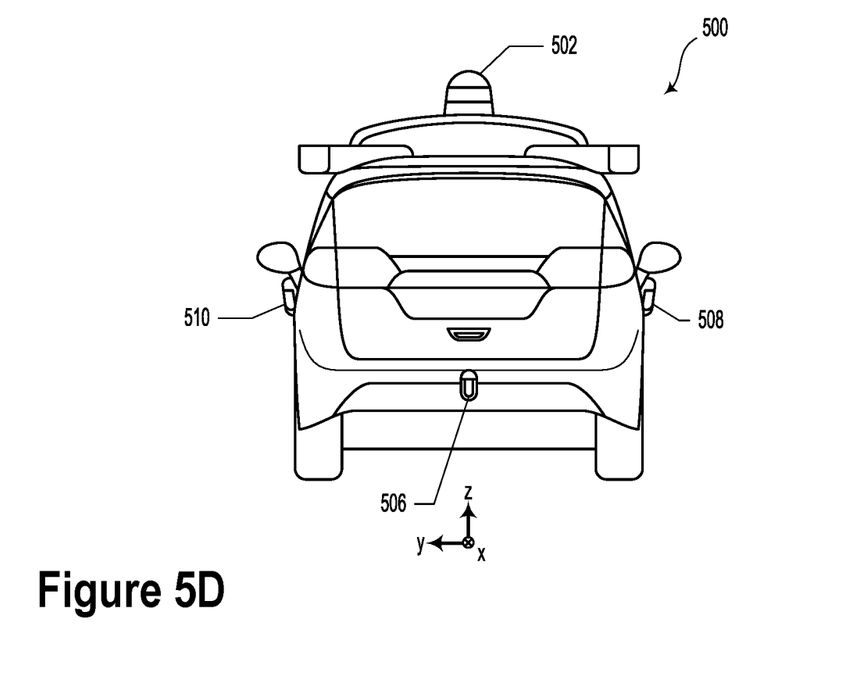
FIG. 5D illustrates a vehicle, according to an example embodiment.
Figure 5E:
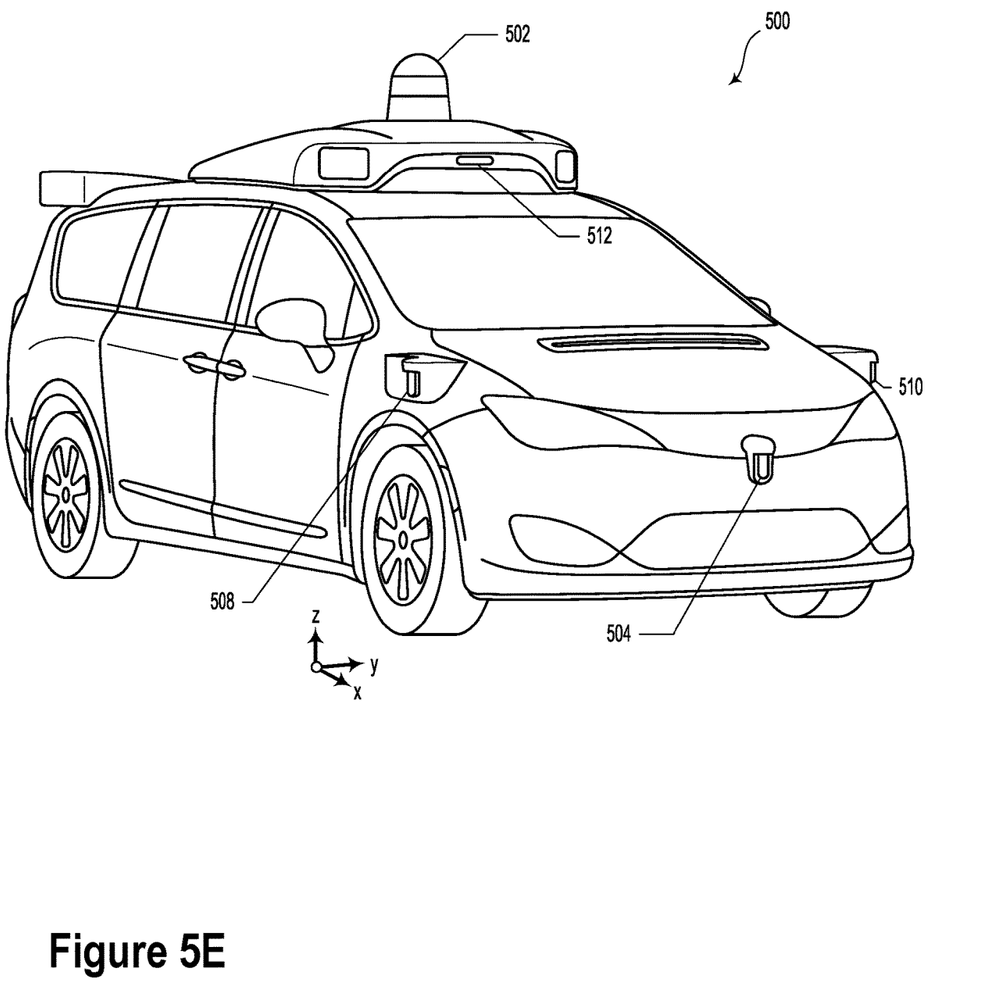
FIG. 5E illustrates a vehicle, according to an example embodiment.

FIG. 4 illustrates an operating scenario 400, according to an example embodiment. The operating scenario 400 could include a return test pulse signal 222 that could be quantified by way of photon counts and/or amplitude 410 versus time. In some examples, the threshold level 156 could be stored in a look up table and/or in the memory 154. As illustrated in FIG. 4, the maximum count/amplitude peak 412 of the return test pulse signal 222 is greater than the threshold level 156. It will be understood that the controller 150 or another type of computing device could be configured to determine the presence of a retroreflector. Furthermore, the measurement of the return test pulse signal 222 could be temporally limited in software or hardware between $T_{min}$ and $T_{max}$. That is, the counts/amplitude 410 will be zero if outside the $T_{min}$-$T_{max}$ range FIGS. 5A, 5B, 5C, 5D, and 5E illustrate a vehicle 500, according to an example embodiment. In some embodiments, the vehicle 500 could be a semi- or fully-autonomous vehicle. While FIGS. 5A, 5B, 5C, 5D, and 5E illustrates vehicle 500 as being an automobile (e.g., a passenger van), it will be understood that vehicle 500 could include another type of autonomous vehicle, robot, or drone that can navigate within its environment using sensors and other information about its environment.

In some examples, the vehicle 500 may include one or more sensor systems 502, 504, 506, 508, 510, and 512. In some embodiments, sensor systems 502, 504, 506, 508, 510 and/or 512 could represent one or more lidar systems 100 as illustrated and described in relation to FIG. 1. In other words, lidar systems described elsewhere herein could be coupled to the vehicle 500 and/or could be utilized in conjunction with various operations of the vehicle 500. As an example, the lidar system 100 could be utilized in self-driving or other types of navigation, planning, perception, and/or mapping operations of the vehicle 500.

In some examples, the one or more devices or systems could be disposed in various locations on the vehicle 500 and could have fields of view that correspond to internal and/or external environments of the vehicle 500.

While the one or more sensor systems 502, 504, 506, 508, 510, and 512 are illustrated on certain locations on vehicle 500, it will be understood that more or fewer sensor systems could be utilized with vehicle 500. Furthermore, the locations of such sensor systems could be adjusted, modified, or otherwise changed as compared to the locations of the sensor systems illustrated in FIGS. 5A, 5B, 5C, 5D, and 5E.

The one or more sensor systems 502, 504, 506, 508, 510, and/or 512 could include other lidar sensors. For example, the other lidar sensors could include a plurality of light-emitter devices arranged over a range of angles with respect to a given plane (e.g., the x-y plane). For example, one or more of the sensor systems 502, 504, 506, 508, 510, and/or 512 may be configured to rotate or pivot about an axis (e.g., the z-axis) perpendicular to the given plane so as to illuminate an environment around the vehicle 500 with light pulses. Based on detecting various aspects of reflected light pulses (e.g., the elapsed time of flight, polarization, intensity, etc.), information about the environment may be determined.

In an example embodiment, sensor systems 502, 504, 506, 508, 510, and/or 512 may be configured to provide respective point cloud information that may relate to physical objects within the environment of the vehicle 500. While vehicle 500 and sensor systems 502, 504, 506, 508, 510, and 512 are illustrated as including certain features, it will be understood that other types of sensor systems are contemplated within the scope of the present disclosure.

While lidar systems with multiple light-emitter devices (e.g., a light-emitter device with multiple laser bars on a single laser die) are described and illustrated herein, lidar systems with single light-emitter devices are also contemplated. For example, light pulses emitted by one or more laser diodes may be controllably directed about an environment of the system. The angle of emission of the light pulses may be adjusted by a scanning device such as, for instance, a mechanical scanning mirror and/or a rotational motor. For example, the scanning devices could rotate in a reciprocating motion about a given axis and/or rotate about a vertical axis. In another embodiment, the light-emitter device may emit light pulses towards a spinning prism mirror, which may cause the light pulses to be emitted into the environment based on an angle of the prism mirror angle when interacting with each light pulse. Additionally or alternatively, scanning optics and/or other types of electro-opto-mechanical devices are possible to scan the light pulses about the environment. While FIGS. 5A-5E illustrate various lidar sensors attached to the vehicle 500, it will be understood that the vehicle 500 could incorporate other types of sensors.

The lidar system also includes a firing circuit (e.g., firing circuit 120) configured to selectively control the plurality of light-emitter devices to emit the light pulses in accordance with one or more adjustable light-emission parameters.

The lidar system further includes a plurality of detectors (e.g., detectors 130).

The lidar system additionally includes a controller (e.g., controller 150) having at least one processor (e.g., processor(s) 152) and a memory (e.g., memory 154). The at least one processor executes instructions stored in the memory so as to perform operations.

The operations can include causing the firing circuit to trigger emission of an initial group of detection pulses (e.g., initial detection pulses 114a) from at least one light-emitter device in accordance with an initial set of one or more light-emission parameters.

The operations include causing the firing circuit to trigger emission of at least one test pulse (e.g., test pulse 112).

The operations also include receiving, from at least one detector, information indicative of at least one return test pulse (e.g., return test pulse 118) that corresponds to an interaction between the at least one test pulse and an object (e.g., object 12) in the environment of the lidar system.

The operations additionally include determining, based on the received information, a presence of a retroreflector (e.g., retroreflector 14) based on an intensity of the return test pulse being above a threshold level (e.g. threshold level 156).

Yet further, the operations include, in response to determining the presence of the retroreflector, determining a subsequent set of one or more light-emission parameters (e.g., pulse energy 124, pulse repetition rate 126, and/or number of detection pulses 128). The subsequent set of one or more light-emission parameters is different than the initial set of one or more light-emission parameters.

In some embodiments, the one or more sensor systems 502, 504, 506, 508, 510, and/or 512 could include image sensors. For example, vehicle 500 could include a camera system that includes an image sensor configured to provide images of a field of view. In various examples, the image sensor may include a plurality of detector elements.

Additionally or alternatively, the vehicle 500 and/or sensor system 502, 504, 506, 508, 510, and/or 512 could include one or more radar systems. The radar system(s) could be configured to emit radio waves to determine the range, angle, and/or relative velocity of objects within the environment 10.

Figure 6:
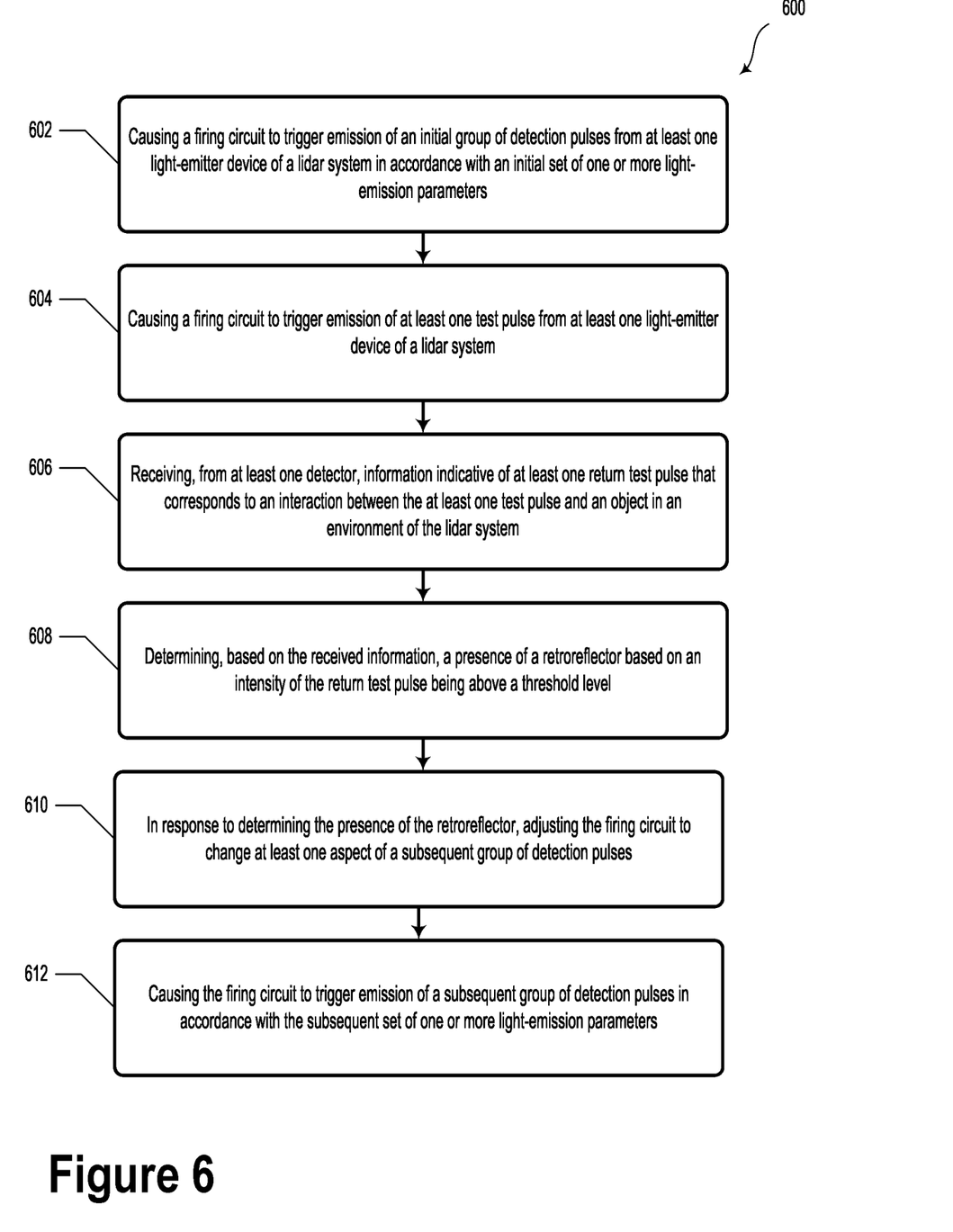
FIG. 6 illustrates a method, according to an example embodiment.

FIG. 6 illustrates a method 600, according to an example embodiment. While method 600 illustrates several blocks of a method, it will be understood that fewer or more blocks or steps could be included. In such scenarios, at least some of the various blocks or steps may be carried out in a different order than of that presented herein. Furthermore, blocks or steps may be added, subtracted, transposed, and/or repeated. Some or all of the blocks or steps of method 600 may be carried out so as to operate the lidar system 100, as illustrated and described in reference to FIG. 1.

Block 602 includes causing a firing circuit (e.g., firing circuit 120) to trigger emission of an initial group of detection pulses from at least one light-emitter device (e.g., light-emitter device 110) of a lidar system in accordance with an initial set of one or more light-emission parameters Block 604 includes causing the firing circuit to trigger emission of at least one test pulse (e.g., test pulse(s) 112). Put another way, as described herein, a trigger signal could be provided to the firing circuit, which may, in turn interact with the light-emitter device so as to actually induce emission of the test pulses 112.

Block 606 includes receiving, from at least one detector (e.g., detector(s) 130), information indicative of at least one return test pulse (e.g., return test pulse(s) 118) that corresponds to an interaction between the at least one test pulse and an object (e.g., object 12) in an environment (e.g., environment 10). As described herein, the environment could include an interior or exterior environment, such as inside a building or outside of the building. Additionally or alternatively, the environment could include a vicinity around and/or on a roadway. Furthermore, the environment could include objects such as other vehicles, traffic signs, pedestrians, roadway surfaces, buildings, terrain, etc. In some scenarios, the plurality of light-emitter devices could include an array of vertical-cavity surface-emitting lasers (VCSELs). Additionally or alternatively, the plurality of detectors could include an array of detector elements that form at least one macropixel.

Block 608 includes determining, based on the received information, a presence of a retroreflector (e.g., retroreflector 14) based on an intensity of the return test pulse being above a threshold level (e.g., threshold level 156).

Block 610 includes, in response to determining the presence of the retroreflector, determining a subsequent set of one or more light-emission parameters. In such scenarios, the subsequent set of one or more light-emission parameters is different than the initial set of one or more light-emission parameters. In various examples, adjusting the firing circuit to change at least one aspect of the subsequent group of detection pulses could include one or more of: 1) changing a pulse energy of the subsequent group of detection pulses; 2) changing a pulse repetition rate of the detection pulses; or 3) changing a number of detection pulses in the subsequent group.

Block 612 includes causing the firing circuit to trigger emission of a subsequent group of detection pulses (e.g., subsequent detection pulses 114b) in accordance with the subsequent set of one or more light-emission parameters.

In some embodiments, the blocks or operations of: 1) causing the firing circuit to trigger emission of the at least one test pulse; 2) receiving information indicative of the at least one return pulse; and 3) determining the presence of the retroreflector could occur during a test pulse phase that is between 1 to 5 microseconds in duration. In other embodiments, the test pulse phase could be between 2 to 10 microseconds or between 5 to 20 microseconds. It will be understood that other test pulse phase durations are possible and contemplated.

In some embodiments, method 600 could additionally include a detection pulse phase. In such scenarios, the test pulse phase and the detection pulse phase could be between 1 to 500 microseconds in total duration. Alternatively, the test pulse phase and the detection pulse phase could be between 10 to 25 microseconds in total duration or between 15 to 40 microseconds in total duration. Other time periods are possible and contemplated.

In some examples, method 600 could include causing the firing circuit to trigger emission of the subsequent group of detection pulses from the at least one light-emitter device.

In example embodiments, the subsequent group of detection pulses could include between 1 to 500 successive light pulses or between 10 to 25 successive light pulses. In some examples, the at least one detector is configured to aggregate the intensity of return pulses that correspond to interactions between the detection pulses and the environment.

In some examples, adjusting the firing circuit to change at least one aspect of the subsequent group of detection pulses could be further based on determining the presence of a retroreflector during at least one prior test pulse phase.

In some embodiments, method 600 could also include dynamically adjusting the threshold level based on at least one of: detector soiling, background light conditions, weather conditions, or precipitation.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A light detection and ranging (lidar) system comprising:
a plurality of light-emitter devices configured to emit light pulses into an environment;
a firing circuit configured to selectively control the plurality of light-emitter devices to emit the light pulses in accordance with one or more adjustable light-emission parameters;
a plurality of detectors; and
a controller configured to perform operations, the operations comprising:
causing the firing circuit to trigger emission of an initial group of detection pulses from at least one light-emitter device in accordance with an initial set of one or more light-emission parameters;
causing the firing circuit to trigger emission of at least one test pulse, wherein:
an emission amplitude of the detection pulses is less than an emission amplitude of the at least one test pulse; or
a pulse duration of the detection pulses is shorter than a pulse duration of the at least one test pulse;
receiving, from at least one detector, information indicative of at least one return test pulse that corresponds to an interaction between the at least one test pulse and an object in the environment;
determining, based on the received information, a presence of a retroreflector or a bright object based on an intensity of the return test pulse being above a threshold level;
in response to determining the presence of the retroreflector, determining a subsequent set of one or more light-emission parameters, wherein the subsequent set of one or more light-emission parameters is different than the initial set of one or more light-emission parameters; and causing the firing circuit to trigger emission of a subsequent group of detection pulses in accordance with the subsequent set of one or more light-emission parameters.

2. The lidar system of claim 1, wherein the operations of causing the firing circuit to trigger emission of the at least one test pulse, receiving information indicative of the at least one return pulse, and determining the presence of the retroreflector occur during a test pulse phase that is between 1 microsecond and 5 microseconds in duration.

3. The lidar system of claim 1, wherein the subsequent set of light-emission parameters comprises a different pulse energy parameter than the initial set of light emission parameters, such that emitted light pulses in the subsequent group of detection pulses have a different pulse energy than emitted light pulses in the initial group of detection pulses.

4. The lidar system of claim 1, wherein the subsequent set of light-emission parameters comprises a different pulse repetition rate parameter than the initial set of light emission parameters, such that the subsequent group of detection pulses has a different pulse repetition rate than the initial group of detection pulses.

5. The lidar system of claim 1, wherein the subsequent set of light-emission parameters comprises a different pulse number parameter than the initial set of light emission parameters, such that the subsequent group of detection pulses has a different number of detection pulses than the initial group of detection pulses.

6. The lidar system of claim 1, wherein the emission of the at least one test pulse occurs during a test pulse phase, wherein the emission of the subsequent group of detection pulses occurs during a detection pulse phase, and wherein a total duration of a combination of the test pulse phase and the detection pulse phase is between 1 microsecond and 500 microseconds.

7. The lidar system of claim 6, wherein the subsequent group of detection pulses comprises between 1 to 500 successive light pulses, and wherein the plurality of detectors is configured to aggregate the intensity of return pulses that correspond to interactions between the detection pulses and the environment.

8. The lidar system of claim 6, wherein the subsequent set of light-emission parameters is based on determining the presence of the retroreflector during a plurality of test pulse phases.

9. The lidar system of claim 1, wherein the threshold level indicative of the presence of the retroreflector or the bright object is dynamically adjusted based on background light conditions, and wherein the background light conditions vary due to a time of day, ambient lighting, internal temperature, external temperature, or headlights from other vehicles.

10. The lidar system of claim 1, wherein the plurality of light-emitter devices comprises an array of vertical-cavity surface-emitting lasers (VCSELs).

11. The lidar system of claim 1, wherein the plurality of detectors comprises an array of detector elements forming at least one macropixel.

12. A vehicle comprising:
a light detection and ranging (lidar) system, the lidar system comprising:
a plurality of light-emitter devices configured to emit light pulses into an environment;
a firing circuit configured to selectively control the plurality of light-emitter devices to emit the light pulses in accordance with one or more adjustable light-emission parameters;
a plurality of detectors; and
a controller configured to perform operations, the operations comprising:
causing the firing circuit to trigger emission of an initial group of detection pulses from at least one light-emitter device in accordance with an initial set of one or more light-emission parameters;
causing the firing circuit to trigger emission of at least one test pulse, wherein:
an emission amplitude of the detection pulses is less than an emission amplitude of the at least one test pulse; or
a pulse duration of the detection pulses is shorter than a pulse duration of the at least one test pulse;
receiving, from at least one detector, information indicative of at least one return test pulse that corresponds to an interaction between the at least one test pulse and an object in the environment;
determining, based on the received information, a presence of a retroreflector or a bright object based on an intensity of the return test pulse being above a threshold level;
determining a subsequent set of one or more light-emission parameters, wherein the subsequent set of one or more light-emission parameters is different than the initial set of one or more light-emission parameters; and
causing the firing circuit to trigger emission of a subsequent group of detection pulses.

13. A method comprising:
causing a firing circuit to trigger emission of an initial group of detection pulses from at least one light-emitter device of a lidar system in accordance with an initial set of one or more light-emission parameters;
causing the firing circuit to trigger emission of at least one test pulse, wherein:
an emission amplitude of the detection pulses is less than an emission amplitude of the at least one test pulse; or
a pulse duration of the detection pulses is shorter than a pulse duration of the at least one test pulse;
receiving, from at least one detector, information indicative of at least one return test pulse that corresponds to an interaction between the at least one test pulse and an object in an environment of the lidar system;
determining, based on the received information, a presence of a retroreflector or a bright object based on an intensity of the return test pulse being above a threshold level;
in response to determining the presence of the retroreflector, determining a subsequent set of one or more light-emission parameters, wherein the subsequent set of one or more light-emission parameters is different than the initial set of one or more light-emission parameters; and
causing the firing circuit to trigger emission of a subsequent group of detection pulses in accordance with the subsequent set of one or more light-emission parameters.

14. The method of claim 13, wherein causing the firing circuit to trigger emission of the at least one test pulse, receiving information indicative of the at least one return pulse, and determining the presence of the retroreflector occur during a test pulse phase that is between 1 microsecond and 5 microseconds in duration.

15. The method of claim 13, wherein the subsequent set of light-emission parameters includes a different pulse energy parameter than the initial set of light-emission parameters, such that emitted light pulses in the subsequent group of detection pulses have a different pulse energy than emitted light pulses in the initial group of detection pulses.

16. The method of claim 13, wherein the subsequent set of light-emission parameters includes a different pulse number parameter than the initial set of light emission parameters, such that the subsequent group of detection pulses has a different number of detection pulses than the initial group of detection pulses.

17. The method of claim 13, wherein the emission of the at least one test pulse occurs during a test pulse phase, wherein the emission of the subsequent group of detection pulses occurs during a detection pulse phase, and wherein a total duration of a combination of the test pulse phase and the detection pulse phase is between 1 microsecond and 500 microseconds.

18. The method of claim 13, wherein the subsequent group of detection pulses comprises between 1 to 500 successive light pulses, and wherein the at least one detector is configured to aggregate the intensity of return pulses that correspond to interactions between the detection pulses and the environment.

19. The method of claim 13, wherein the subsequent set of light-emission parameters is based on determining the presence of the retroreflector during a plurality of test pulse phases.

20. The method of claim 13, wherein the threshold level indicative of the presence of the retroreflector or the bright object is dynamically adjusted based on background light conditions, and wherein the background light conditions vary due to a time of day, ambient lighting, internal temperature, external temperature, or headlights from other vehicles.

* * * * *